Dec. 17, 1935. O. N. McCORMICK 2,024,978
FLOUR SIFTER
Filed March 22, 1933
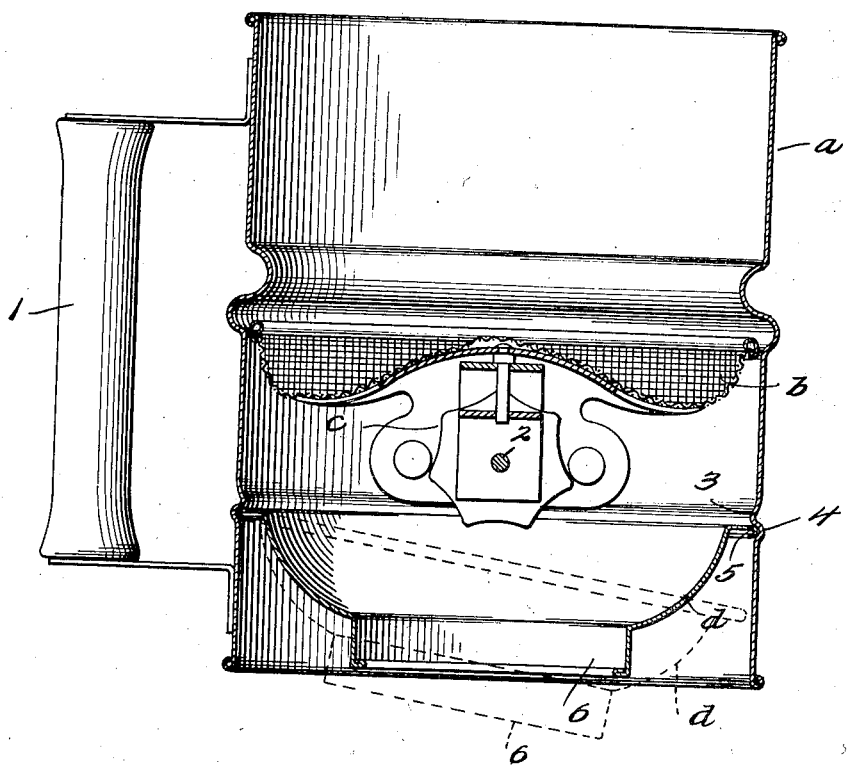
Inventor
Ora N. McCormick
By
Robert Watson
Attorney Patented Dec. 17, 1935

2,024,978

UNITED STATES PATENT OFFICE 2,024,978

FLOUR SIFTER

Ora N. McCormick, Albany, Ind., assignor to McCormick Brothers Company, Albany, Ind., a corporation of Indiana Application March 22, 1933, Serial No. 662,164

1 Claim. (Cl. 209—255)

This invention relates to portable flour sifters. In carrying out the invention, I provide a cylindrical sheet metal casing in the central portion of which is arranged sifting mechanism preferably like that shown in my Patent Number 1,808,426, dated June 2, 1931. The casing is provided with a suitable handle and is open at its ends so that the flour may be poured through the upper end into the sifting basket and the sifted flour may pass out through the lower end of the casing and be distributed over an area equal in diameter to the diameter of the casing. It is desirable at times to distribute the sifted flour over a more restricted area and for this purpose I provide a funnel which is detachably connected to the inner surface of the casing immediately below the sifting mechanism. This funnel is wholly within the sifter casing so that the funnel will not interfere with setting the casing in an upright position upon any flat surface. The funnel is provided with a laterally projecting flange or rim at the top and this is of slightly greater diameter than the interior diameter of the casing. The casing is formed with annular corrugations below the sifting mechanism, forming an inwardly extending annular shoulder and an annular recess immediately below the shoulder. By turning the funnel so that its central axis is at an angle to the central axis of the casing, the funnel may be pressed into the casing until one part of the flange engages said shoulder, when a slight blow on the bottom of the funnel will force the flange into the recess in the casing. To remove the funnel, the operator takes hold of its outlet end and pulls the funnel laterally and downwardly and when the axis of the funnel is at an angle to the axis of the casing, the funnel may easily be withdrawn from the casing.

In the accompanying drawing, the sifter and funnel are shown in central vertical section, the dotted lines indicating the manner in which the funnel is inserted into or removed from the casing.

Referring to the drawing; *a* represents the sifter casing which is cylindrical in form and provided with a handle 1 by which it may be supported. In the central portion of the casing is arranged a sifter basket *b* and mechanism *c* for oscillating the basket. This mechanism is the same as that described in the aforesaid patent and it is operated by a shaft 2 which extends through the casing, as in said patent. As the sifting mechanism forms no part of the present invention, it is not shown or described in detail.

Below the sifting mechanism the casing is annularly corrugated as shown at 3 and 4, the inward crease 3 forming an annular shoulder on the inner wall of the casing and the outward crease 4 forming an annular recess immediately below the shoulder.

The funnel *d*, made of sheet metal, has a beaded flange 5 at its upper end, of slightly greater diameter than the inner diameter of the casing, and it has a central outlet portion 6, suitably formed to receive a cap, not shown. As shown in full lines, the edge of the flange or rim 5 of the funnel fits into the annular recess 4 and the funnel is thereby supported in the casing. To remove the funnel, the operator grasps its lower end and pulls downwardly and laterally on the funnel until one part of its flange slips out of the recess 4 and when the funnel is turned so that its central axis is at an angle to the central axis of the casing, the funnel may be pulled out of the casing. When the funnel is tilted as shown, its flange bears upon the wall of the casing at two diametrically opposite points only and the casing, being made of sheet metal, will yield sufficiently at the points of contact to permit the funnel to be withdrawn. To replace the funnel, the operation is reversed, the funnel being tilted to insert it through the lower end of the casing until its rim touches the shoulder 3 and then a further pressure or a slight blow on the bottom of the funnel forces the rim into the recess.

As shown in the drawing, the funnel, when placed in its operative position in the casing, lies wholly within the casing so that the latter may be set on a flat surface in upright position without interference by the funnel.

What I claim is:

A portable flour sifter comprising a cylindrical sheet metal casing, sifting mechanism mounted in the central part of the casing, said casing having annular corrugations below said mechanism, forming on the interior of the casing an annular shoulder and an annular recess below and adjacent the shoulder, and a sheet metal funnel, independent of the sifting mechanism and wholly within the casing, having an annular rim, slightly greater in diameter than the internal diameter of the casing, sprung into said recess, said funnel being insertable and removable through the lower end of the casing.

ORA N. McCORMICK.